T. B. CARPENTER.
Lid-Lifter.
No. 167,219. Patented Aug. 31, 1875.
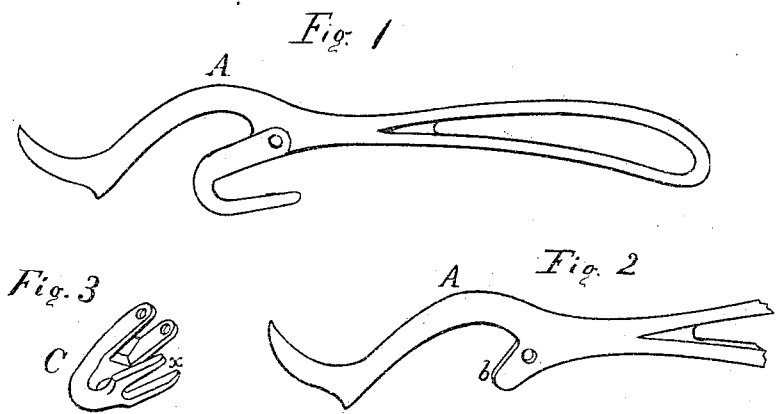
Witnesses
Roger M. Sherman
William F. Hopson
Inventor
Thacher B. Carpenter

UNITED STATES PATENT OFFICE.

THACHER B. CARPENTER, OF NEW HAVEN, CONNECTICUT.

IMPROVEMENT IN LID-LIFTERS.

Specification forming part of Letters Patent No. 167,219, dated August 31, 1875; application filed August 9, 1875.

*To all whom it may concern:*

Be it known that I, THACHER B. CARPENTER, of the city and county of New Haven, and State of Connecticut, have invented a new and useful Improvement in Lid-Lifters and Tipping-Hooks; and I do hereby declare the following to be a full, clear, and exact description of the invention, such as will enable others skilled in the art to which it pertains to make and use it, reference being had to the accompanying drawing, in which—

Figure 1 is a side view of both the lid-lifter and tipping-hook. Fig. 2 is a side view of the lifter with its projection, and Fig. 3 is a view of the tipping-hook.

My invention relates to that class of lid-lifters and tipping-hooks in which the lifter and tipping-hook are constructed on one and the same handle; and consists in providing the handle of the lid-lifter with a projection, operating in connection with the tipping-hook, and to which the tipping-hook is pivoted, and in a modification of the hook.

The letter b, Fig. 2, points out the projection from the lid-lifter A, to which the tipping-hook C is pivoted. This projection is longer than is required, merely to serve as an arm, to which the hook C may be pivoted. The hook C, Fig. 3, is made in the shape of the capital letter M. One of its ends may be forked, or not, at the pleasure of the maker. The other end has a slot, x, to fit the projection b. One side of the lower part of this slot is not cut away, and rests on the projection b, and forms a notch at the bottom of the slot. The hook is pivoted to the projection b, and its motion in one direction is limited by the projection b, and in the other by the handle of the lid-lifter A.

In using my improved implement for discharging the contents of kettles and pots, the hook C is put down over the edge of the pot, and as the handle is raised the pot is firmly grasped by one arm of the hook C and the end of the projection b, made long for the purpose, and the pot may be tipped to any degree desired without the hand holding the implement being burned.

I claim as my invention—

1. The lid-lifter A, made with the projection b, having the tipping-hook C pivoted to the same, and extending beyond the pivot, to operate in connection with the hook, all the said parts constructed and combined to operate in the manner described.

2. The tipping-hook C, made with the notch at the bottom of the slot x, as described, pivoted to the projection b, and limited in its motion by the projection b and the handle of the lid-lifter A, all the said parts constructed and combined to operate in the manner described.

THACHER B. CARPENTER.

Witnesses:
GEORGE TERRY,
W. R. WHITTEMORE.